United States Patent [19]
Cizek et al.

[11] Patent Number: 5,168,575
[45] Date of Patent: Dec. 1, 1992

[54] DEMAND DRIVEN WIDE-AREA RADIO SYSTEM RESOURCE ASSIGNMENT METHOD AND APPARATUS

[75] Inventors: Paul J. Cizek, Palatine; David R. Kinsman, Wheaton, both of Ill.

[73] Assignee: Motorola, Inc., Schaumburg, Ill.

[21] Appl. No.: 589,351

[22] Filed: Sep. 28, 1990

[51] Int. Cl.$^5$ .................. H04Q 7/04; H04Q 9/02
[52] U.S. Cl. .................. 455/33.1; 455/33.4; 455/15; 379/59
[58] Field of Search .............. 455/33, 34, 54, 56, 455/67, 33.1, 33.2, 33.3, 33.4, 34.2, 54.1, 67.1; 379/59, 63

[56] References Cited

U.S. PATENT DOCUMENTS

| | | |
|---|---|---|
| 3,764,915 | 10/1973 | Cox et al. .................. 455/33.1 |
| 3,898,390 | 8/1975 | Wells et al. .................. 455/33.1 |
| 4,573,206 | 2/1986 | Gravel et al. .................. 455/33.1 |
| 4,670,889 | 6/1987 | Brody et al. .................. 455/33.4 |
| 4,723,264 | 2/1988 | Sasuta et al. .................. 379/59 |
| 4,759,051 | 7/1988 | Han .................. 379/59 |
| 4,866,710 | 9/1989 | Schaeffer .................. 379/59 |
| 5,058,201 | 10/1991 | Isii et al. .................. 455/33.2 |

Primary Examiner—Reinhard J. Eisenzopf
Assistant Examiner—Timothy H. Keough
Attorney, Agent, or Firm—Jon Christensen

[57] ABSTRACT

A method of re-using communication resources within a trunked mobile communication system by incrementally allocating common communication resources in adjacent service coverage areas to service common communication transactions during periods of heavy system loading.

13 Claims, 4 Drawing Sheets

DEMAND DRIVEN WIDE-AREA RADIO SYSTEM RESOURCE ASSIGNMENT METHOD AND APPARATUS

TECHNICAL FIELD

This invention relates to communication systems and more specifically to trunked RF communication systems.

BACKGROUND

Trunked RF communication systems are known. Such systems typically allocate communication resources to communication units upon perception of a need by a resource controller. The request for a communication resource is transmitted to a resource controller over a control communication resource, in some systems, reserved for that purpose. The communication unit, upon receiving the allocation, tunes to the allocated frequency and begins transmitting a message.

The resource controller in granting the resource allocation may also allocate a transceiver (repeater) at a base site in support of the communication transaction. The repeater receives transmissions from the requesting communication unit and re-transmits the message for the benefit of any target communication units present with the service coverage area of the base site.

The resource request transmitted by a requesting communication unit in addition to containing the requestor's ID may also contain an ID of a target or group of targets. In trunked dispatch communication systems the target may consist of a number of communication units located within the same service coverage area as the requestor or located within a number of different service coverage areas.

In communication systems where targets are typically located in a number of different service coverage areas a resource controller typically transmits a system-wide paging alert followed by a system-wide allocation of communication resources. Such allocation of resources may occur even in the absence of target units within specific service coverage areas.

The communication resource allocated in a system-wide call may consist of the same resource, as in a same frequency simulcast system, or of a different resource in each service coverage area, as in a different frequency simulcast system (for a description of simulcast systems, in general, see System Design Aspects of a Simulated Trunked System, by Michael Sasuta, Vehicular Technology Conference-IEEE 32, May 23—26, 1982, IEEE Ref. No. 82CH1720-2, Library of Congress Cat. No. 8184746). Same frequency simulcast systems, as is known, suffer from a number of disadvantages. Chief among the disadvantages of same frequency simulcast systems include dead spots and multi-path fading caused by multiple transmission paths.

Alternatives to simulcast systems exists. Alternatives include the allocation of a unique communication resource in each service coverage area as in a wide area cellular telephone system. Wide area cellular telephone systems (as with many Simulcast systems) are typically controlled by a resource controller. The resource controller upon allocation of a resource from a base site acts to preclude re-allocation of the resource in adjacent base sites. Such a preclusion is necessary to prevent the resultant interference experienced in same frequency Simulcast systems.

A disadvantage of the different frequency Simulcast system include a decrease in spectral efficiency caused by the simultaneous use of additional communication resources. An advantage of the different frequency simulcast system, on the other hand, lies in the increase in received signal quality over same frequency simulcast systems. During periods of heavy system activity, on the other hand, the different frequency simulcast system restricts system capacity over that provided by same frequency simulcast. A need exists for an alternative operating system providing fewer disadvantages than the different frequency simulcast system, on the one hand, and same frequency simulcast system on the other under the various system loading levels experienced within communication systems.

SUMMARY OF THE INVENTION

Pursuant to one embodiment of the invention a method of re-using communication resources within a trunked communication system having a resource controller, a number of mobile communication units, and a number of base site containing a control transceiver and at least one repeater with each base site, upon occasion, providing communication services to communication units is provided. The method includes the steps of determining by the resource controller that the number of unallocated communication resources within the system is not acceptable, identifying adjacent base sites servicing the same communication transaction, and allocating a common resource to communication units participating in the common communication transaction within the service coverage areas of the adjacent base sites.

During periods of light communication system activity a unique communication resource is assigned by the base site in each adjacent service coverage area for each communication transaction. To reduce interference, the allocation of a resource in a first service coverage area (primary allocation) precludes use of the resource in adjacent, second service coverage areas (becomes a guarded resource). Guarded resources may be reused in other areas of the system but not, in normal circumstances, in adjacent service coverage areas.

As system activity increases fewer unallocated communication resources remain unallocated. As unallocated communication resources within the system decreases to a predetermined level the resource controller acts to reduce system loading by assigning common communication resources to communication units located in adjacent sites that are part of a common communication transaction.

In one embodiment of the invention communication units are constructed to register their location with the resource controller through a local base site whenever the communication unit is activated or enters a different service coverage area. Communication resources are allocated only in service coverage areas in which a target has registered its presence.

BEST MODE FOR CARRYING OUT THE INVENTION

Figure 1:
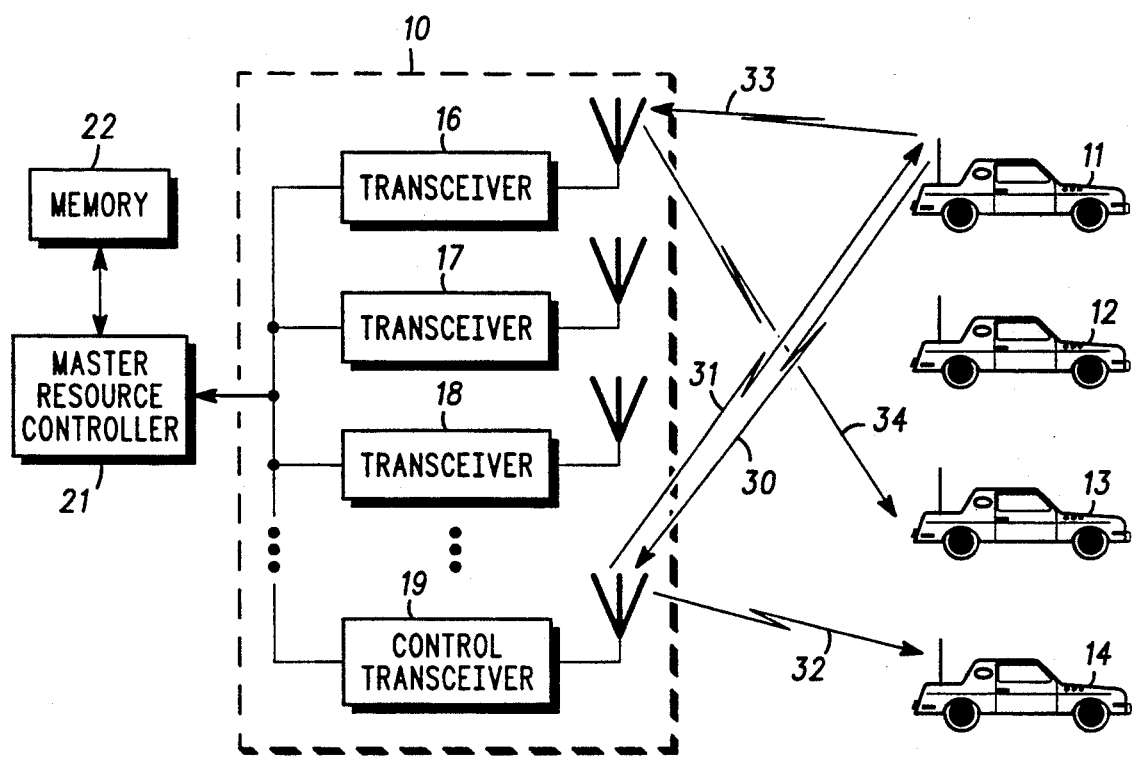
FIG. 1 comprises a block diagram of a single cell of a trunked communication system.

Shown (FIG. 1) is a block diagram of equipment operationally associated with a single cell of a communication system generally (5) under one embodiment of the invention. Included therein are a plurality of communication units (11 through 14) (as used herein, "communication units" refers to mobile units, portable units, or fixed location units), base site equipment (10) including transceivers (16 through 18), and a control transceiver (19), a resource controller (21) with an attached memory unit (22).

The block diagram (FIG. 1) represents a trunked RF communication system as known generally to those in the art. Because the system (5) is generally known no further explanation will be offered as the workings of individual blocks beyond that necessary to describe the invention.

In general to establish a call, a communication unit (11, FIG. 1) transmits a resource request (30) to a control transceiver (19). The control transceiver (19) receives the request (30) and communicates such request to a resource controller (21). Contained within the resource request (30) may be such information as an ID of the communication unit (11), and a group ID number.

The resource controller (21) receives the resource request (30) and upon reference to a memory unit (22) verifies that the ID of the communication unit (11) is a valid number and is registered within the system. The resource controller (21) also, by reference to the memory unit (22) identifies the communication group (talk group) of which the communication unit (11) is a part. By identification of the communication group of which the communication unit (11) is a part the resource controller (21) also identifies other communication units (targets) that are part of the same group as the requesting communication unit (11) (for purposes of this example, communication units (11, 13, and 14) will be defined as a single group).

Upon verifying the ID of the communication unit (11) the resource controller (21) communicates back, in response, a resouce ID to be allocated within the service coverage area of the base site. Upon receiving the resource ID from the resource controller, the control transceiver (19) transmits the resource grant (31) to the requesting communication unit (11). The requesting communication unit (11) upon receiving the resource grant (31) tunes to the allocated resource and begins transmitting.

At the same time as the resource grant (31) is transmitted to the requesting communication unit (11) a resource grant (32) is also transmitted to any target communication units (13 and 14) present within the cell (10). A transceiver (16) is also allocated to service the communication transaction between the requesting communication unit (11) and target units (13 and 14).

The requesting communication unit (11) begins transmitting a signal (33) which signal (33) is repeated (34) by the transceiver (16) for the benefit of the target communication units (13 and 14).

Figure 2:
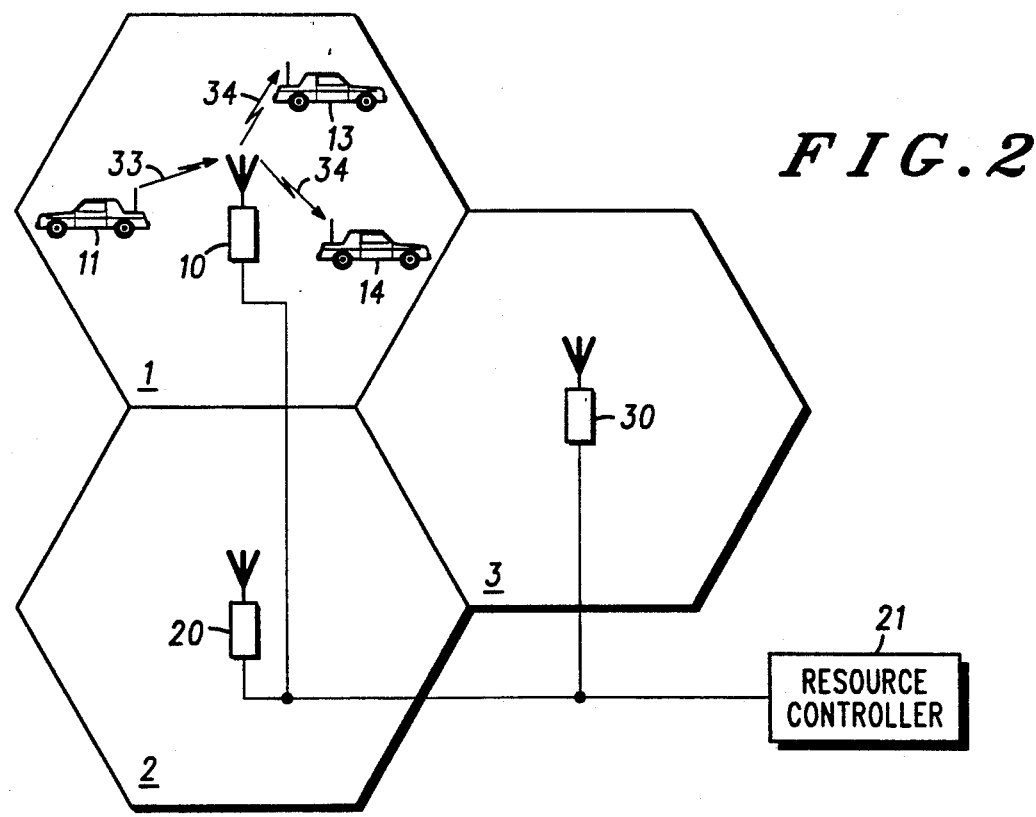
FIG. 2 comprises a depiction of three adjacent cells of a trunked communication system.

Shown (FIG. 2) is a communication system having three cells (1, 2, and 3) serviced by base sites (10, 20, and 30) each in contact with a resource controller (21). Shown within cell 1 is the situation substantially described in FIG. 1. As shown (FIG. 2) a requesting communication unit (11) is transmitting a signal (33, 34) to target communication units (13, and 14). As shown (FIG. 2) all communication units within the group (11, 13, and 14) are within cell 1. Because all communication units within the group (11, 13, and 14) are within the cell (1) a resource is allocated within cell 1 exclusively.

Figure 3:
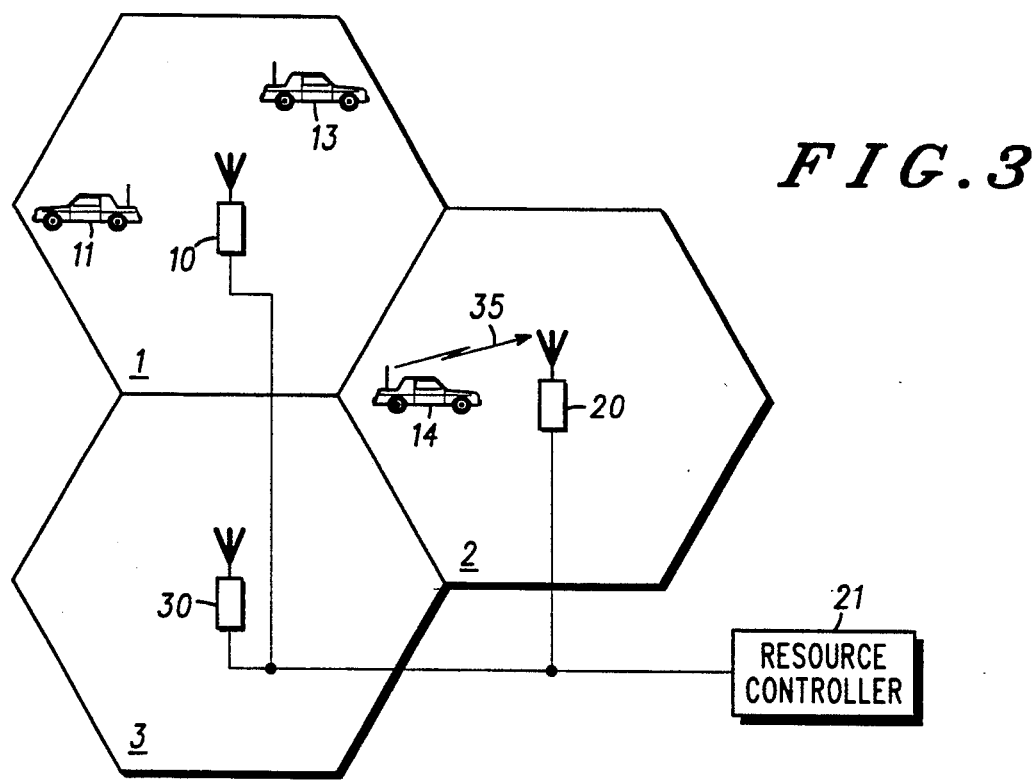
FIG. 3 comprises a depiction of three adjacent cells of a trunked communication system with communication units in two of the three cells.

Shown in FIG. 3 is an example of a communication transaction involving the same group of communication units (11, 13, and 14). As shown (FIG. 3) the communication transaction (FIG. 1 and 2) has ended and the communication units (11, 13, and 14) have returned to a control resource to monitor for calls. Communication unit (14) is shown to have crossed into cell 2. In crossing into the adjacent cell (2) the communication unit (14) detects the weakening signal transmitted by the control transceiver (19) in cell 1 and scans for another control resource in an adjacent cell (2). The communication unit (14) detects the control resource used by the base site (20) and immediately transmits a control word (35) registering its presence within cell 2. The control word (35) is transferred to the resource controller (21) (not shown in FIG. 3). The registration of the location of communication unit (14) is stored by the resource controller (21) in the associated memory unit (22).

Upon the receipt of a resource request from the original requesting communication unit (11 as in the previous example) a first resource is granted in cell 1 as in the previous example. The first resource supports the transmission of a signal from the requesting communication unit (11) to a local target communication unit (13).

The resource controller (21), the other hand, now lists a target communication unit (14) in cell 2. In response the resource controller (21) transmits a resource allocation to the base site (20) in cell 2 allocating a communication resource to the target communication unit (14) in support of a communication transaction common to two cells (1 and 2).

Figure 6:
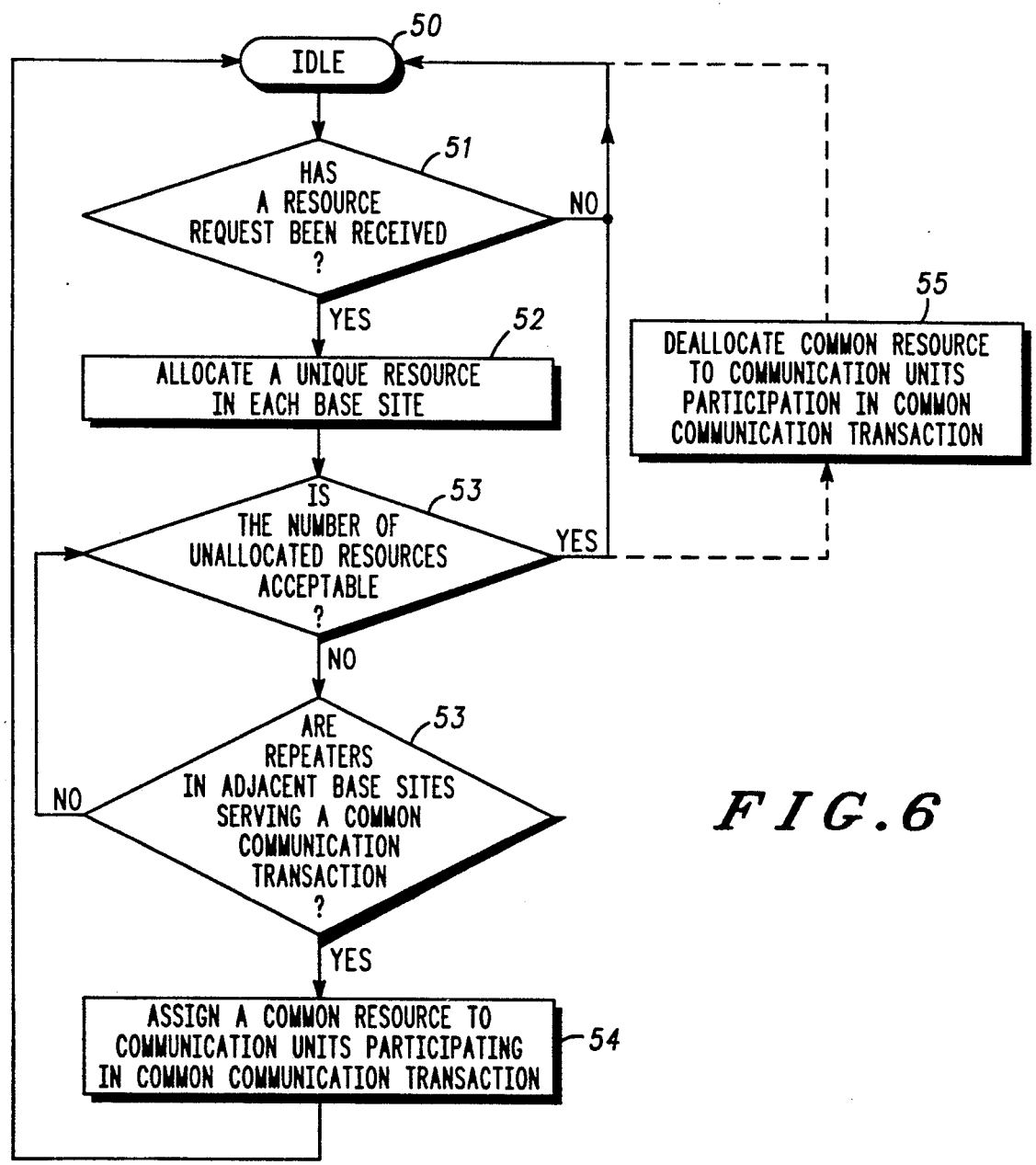
FIG. 6 comprises depicts a flow chart of the method used by the invention.

The flow chart (FIG. 6) represents a summary of the process in FIG. 3. The resource controller (21) upon receiving a resource request (31) (51) allocates a unique resource (52) to target communication units in each cell (1 and 2).

In one embodiment of the invention, use of a first communication resource in cell 1 normally precludes use of the resource in adjacent service coverage areas (becomes a guarded resource). The guarding of resources under conditions of light system loading reduces the incidence of mutual interference.

The resource controller (21) in the example (FIG. 3) consequently assigns a second communication resource (52) in support of the common communication transaction represented by the transmission from the requesting communication unit (11) to the target communication unit (14) in cell 2. Use of the first and second resources and guarding the resources in adjacent cells under this embodiment results in the least mutual interference of transmitted signals.

Figure 4:
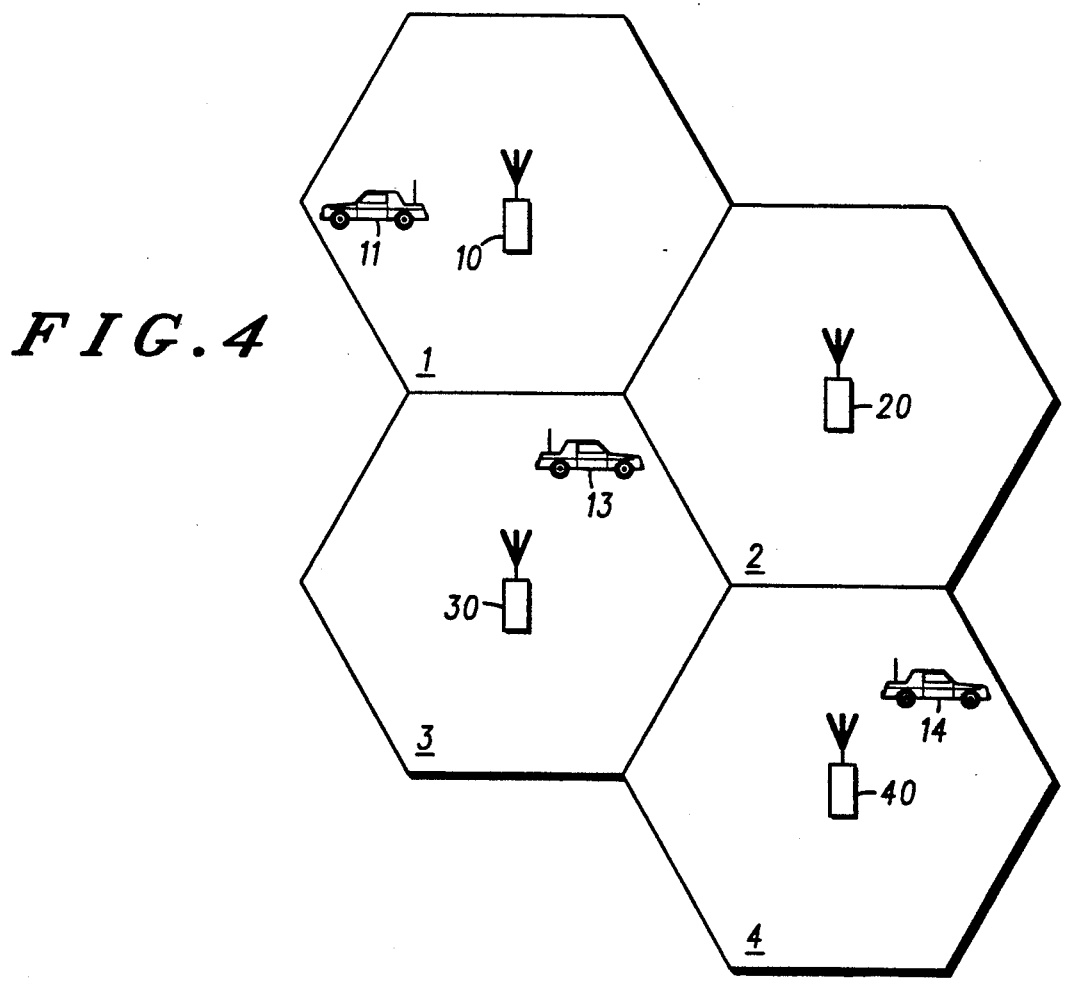
FIG. 4 comprises a depiction of four cells of a trunked communication system.

Shown in FIG. 4 communication units (13 and 14) have moved outside the original cell (1) and registered upon entering other cells (3 and 4) by the transmission of a control word to the resource controller through the base sites (30 and 40). Upon receiving a resource request from the originating communication unit (11) the resource controller (21) must now allocate a communication resource in three cells (52) (1, 3, and 4). In allocating resources the resource controller allocates a first resource in the first cell (1). Since one communication unit (13) is located in an adjacent cell (3) the first resource becomes a guarded resource in cell 3. However, communication unit 14 located in cell 4 isn't an adjacent cell and the resource controller also allocates the first resource in cell 4. A second, unique resource, however, is still necessary in cell 3 to service the remaining target communication unit (13).

In one embodiment of the invention the resource controller (21) monitors the number of unallocated communication resources available within the system. Upon detecting that the number of unallocated resources is not acceptable (detects an inadequate supply of unallocated communication resources) (53) then a common resource is allocated (54) to support common communication transactions in adjacent cells (1 and 3) and (3 and 4). In the example the first guarded resource allocated in cell 1 is also allocated in cell 3 in support of the common communication transaction between communication units 11, 13, and 14.

In one embodiment of the invention if the resource controller (21) should later detect that the number of unallocated resources no longer exceeds the threshold then the common resource is de-allocated and communication unit 13 is re-assigned to a unique communication resource (55).

Figure 5:
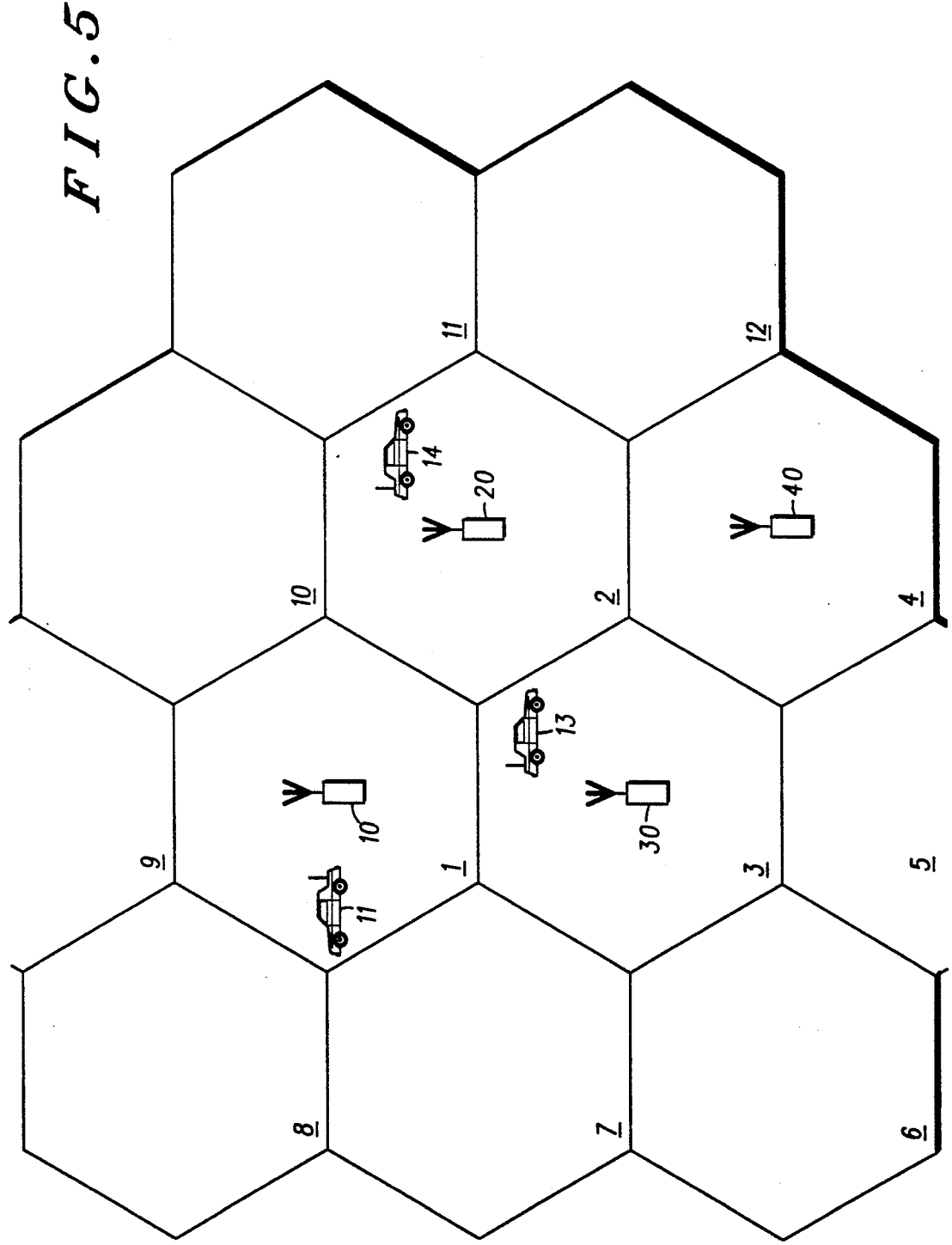
FIG. 5 comprises a depiction of twelve cells of a trunked communication system.

Shown in FIG. 5 communication unit (14) has moved into cell 2. Upon initiation of a call by a requesting communication unit (13) a first unique communication resource is allocated in cell 3. A second unique communication resource is allocated (52) in cell 1. A third unique communication resource is also allocated in cell 2. The first resource becomes a guarded resource in cells 1, 2, 4, 5, 6, and 7. The second resource similarly becomes a guarded resource in cells 2, 3, 7, 8, 9, and 10. The third resource becomes a guarded resource in cells 4, 3, 1, 10, 11, and 12.

If the resource controller (FIG. 5, not shown) should detect that the number of unallocated resources within the system is not acceptable then a common resource is allocated to the common transaction (54). In the example shown the first resource (cell 3) is also allocated in cells 1 and 2. The second and third resources become available for allocation to other communication units.

What is claimed is:

1. A method of re-using communication resources within a trunked communication system having:
   A) a plurality of communication units;
   B) a resource controller including a memory unit containing at least one talk group and the IDs of at least two communication units of the plurality of communication units within the at least one talk group;
   C) a plurality of service coverage areas, each having at least one repeater and one control transceiver operably coupled with the resource controller and, upon occasion, transmitting resource allocations to communication units within the at least one talk group: and,
   D) a plurality of unallocated communication resources for use within the service coverage areas in servicing requests for service from a communication unit within a talk group requesting access to the talk group, such method including the steps of:

A) determining by the resource controller that the number of unallocated communication resources is not acceptable;
   B) identifying at least two repeaters in adjacent service coverage areas servicing a common communication transaction between members of the talk group; and,
   C) assigning by the resource controller a common communication resource to service the common communication transaction.

2. The method as in claim 1 further including the step of de-allocating common resources when the number of unallocated resources is acceptable.

3. The method as in claim 1 wherein communication units within a talk group register their location upon entering the service coverage area by a transmitted message to the resource controller.

4. The method as in claim 3 wherein communication resources in support of a common communication transaction are allocated only in those service coverage areas in which a target communication unit has registered its presence.

5. A communication system for re-using communication resources, within a trunked system, such system comprising:
   A) means for receiving a resource request from a requesting communication unit by a first base site;
   B) means for communicating the resource request to a resource controller;
   C) means for, upon occasion, locating an at least one target communication unit in a service coverage area of an at least second base site by the resource controller;
   D) means for, upon occasion, allocating a first communication resource of a number of unallocated communication resources to the requesting communication unit by the first base site and a second communication resource of the number of unallocated communication resources to the at least one target communication unit served by the at least second base site;
   E) means for, upon occasion, detecting that the number of unallocated communication resources within the trunked system is not acceptable; and,
   F) means for assigning common resources in adjacent service coverage areas when the number of unallocated communication resources is not acceptable.

6. The system as in claim 5 wherein common resources are de-allocated by local base sites upon a detection by the means for detecting that unallocated communication resources within the system are acceptable.

7. The system as in claim 5 wherein the means for locating communication units comprises a memory unit within the resource controller and within which communication units register their location upon entry of the communication unit into the service coverage area of a base site through the base site by a message communicated to the resource controller.

8. A method of allocating communication resources to support a communication, comprising the steps of:
   A) identifying a need for communication in a first and at least second, adjacent service areas;
   B) determining whether at least a predetermined quantity of unallocated communications resources are available;
   C) when at least the predetermined quantity of unallocated communications resources are available, allocating a first communication resource in the first service area, and a second communication resource in the second area, and allocating D) when at least the predetermined quantity of unallocated communications resources are not available, allocating a common communication resource to support the communication in both the first and second service area.

9. The method of claim 2 further including the step of allocating unique communication resources when the number of unallocated resources is acceptable.

10. The method as in claim 8 wherein the step of identifying a need for communications in at least a first and second service coverage areas further includes the step of receiving a resource request from a communication unit in the first service area and identifying a target in the at least second service area.

11. A method of re-using communication resources within a trunked radio communication system having a plurality of service coverage areas, and a resource controller allocating communication resources from a list of unallocated communication resources to an at least one talk group, such method comprising the steps of:

A) comparing the list of unallocated resources with a threshold by the resource controller;

B) when the list does not exceed the threshold, allocating different communication resources of the list of unallocated communication resources to a talkgroup in adjacent service coverage areas; and, C) when the list exceeds the threshold, allocating common communication resources of the list of unallocated communication resources to a talkgroup in adjacent service coverage areas.

12. The method as in claim 11 further including the step of reallocating different communication resources when the list does not exceed the threshold.

13. The method as in claim 11 further including the step of reallocating the common communication resource when the list exceeds the threshold.

* * * * *